United States Patent
Camnitz et al.

(10) Patent No.: US 6,865,496 B2
(45) Date of Patent: Mar. 8, 2005

(54) ZERO-CROSSING DIRECTION AND TIME INTERVAL JITTER MEASUREMENT APPARATUS USING OFFSET SAMPLING

(75) Inventors: Lovell H. Camnitz, Santa Rosa, CA (US); Roger L. Jungerman, Petaluma, CA (US); Randall King, Santa Rosa, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 491 days.

(21) Appl. No.: 10/003,918

(22) Filed: Nov. 1, 2001

(65) Prior Publication Data

US 2003/0081667 A1 May 1, 2003

(51) Int. Cl.[7] ............................................. G01R 29/26
(52) U.S. Cl. .................................... 702/69; 702/106
(58) Field of Search ................................. 702/106, 69

(56) References Cited

U.S. PATENT DOCUMENTS

| | | | |
|---|---|---|---|
| 4,362,394 A | | 12/1982 | Menlove ..................... 368/118 |
| 4,876,655 A | | 10/1989 | Carlton et al. .............. 364/487 |
| 4,908,784 A | | 3/1990 | Box et al. .................... 364/569 |
| 5,162,723 A | | 11/1992 | Marzalek et al. ......... 324/77 B |
| 5,631,553 A | * | 5/1997 | Bose et al. ................. 324/76.24 |
| 6,185,509 B1 | | 2/2001 | Wilstrup et al. .............. 702/69 |
| 6,242,899 B1 | * | 6/2001 | Miller ...................... 324/76.24 |
| 6,522,983 B1 | * | 2/2003 | Dobos et al. ................. 702/89 |
| 6,640,193 B2 | * | 10/2003 | Kuyel .......................... 702/69 |
| 2002/0196055 A1 | * | 12/2002 | Jungerman ................... 327/91 |

FOREIGN PATENT DOCUMENTS

WO    WO 99/39216    8/1999

OTHER PUBLICATIONS

C.W. Rella, G.M.H. Knippels, D.V. Palanker, and H.A. Schwettman; *Pulse Shape Measurements Using Differential Optical Gating of a Picosecond Free Electron Laser Source With an Unsynchronized Femtosecond Ti:sapphire Gate*; Optics Communications 157 (1998); pp. 335–342.

* cited by examiner

*Primary Examiner*—Marc S. Hoff
*Assistant Examiner*—Anthony Gutierrez

(57) ABSTRACT

A sampling apparatus for use in high data rate jitter measurement systems based on offset sampling uses a trigger circuit, along with a time-based variable delay, to align a sampling strobe to drive two samplers. An input data signal is split and fed via separate signal paths into the two samplers. One of the samplers is delayed in sampling the input signal or the input is delayed to one of the samplers, such that the two samples of the input signal are offset in time. The jitter present in the SUT can be calculated using the two samples. In addition, when using two strobe circuits, the jitter inherently present in the strobe circuits can be compensated for by offset sampling a reference clock with each main strobe to determine the phase and cycle number of the reference clock at each strobe time.

35 Claims, 15 Drawing Sheets

US 6,865,496 B2

ZERO-CROSSING DIRECTION AND TIME INTERVAL JITTER MEASUREMENT APPARATUS USING OFFSET SAMPLING

BACKGROUND OF THE INVENTION

1. Technical Field of the Invention

The present invention relates generally to test and measurement systems, and specifically to measurement of the jitter in electrical and optical data streams.

2. Description of Related Art

Jitter is the deviation of the actual zero-crossing time of a signal from the ideal zero-crossing time. The signal zero-crossing time refers to the time that the amplitude of a data signal crosses a decision threshold (e.g., one-half amplitude) of a signal transition (e.g., a rise or fall of the signal). Measuring the jitter in serial data communications systems ensures that the jitter (if any) present in the system does not cause errors. There are a number of techniques for measuring jitter at lower frequencies. Examples of devices that have been used to measure the jitter in data streams include real-time digital oscilloscopes, phase-detector-based jitter measurement devices that include clock recovery circuits to convert the data stream into a periodic clock signal and time interval measurement devices that use a trigger circuit to measure the timing of a signal zero-crossing.

However, as signaling rates of serial communications signals increase, e.g. up to and above 40 Gb/s, measuring the jitter becomes problematic. For example, real-time digital oscilloscopes have inadequate bandwidth (currently about 4 GHz) to faithfully digitize 40 Gb/s waveforms. In addition, clock recovery circuits at 40 Gb/s suffer from severe tradeoffs between jitter transfer bandwidth (i.e., the limit on the low-pass characteristic of the clock recovery circuit) and jitter noise floor (i.e., the limit on the suppression of unintentional jitter not related to the jitter on the original signal). Furthermore, at 40 Gb/s, the limited bandwidth, phase distortion and intrinsic jitter contribution of current trigger circuit technology in time interval measurement devices would significantly distort the measurement result.

High-speed electronic sampling oscilloscopes offer one solution to the problem of measuring the jitter in high data rate signals. High-speed electronic sampling oscilloscopes use a single trigger circuit that triggers a sampling strobe to generate a pulse upon the detection of a zero-crossing in a trigger signal at the input of the trigger circuit. Each output pulse drives a sampler that measures the amplitude of the signal-under-test (SUT) at the ideal zero-crossing time. However, high-speed electronic sampling oscilloscopes are limited in their ability to measure the jitter.

For example, in high-speed electronic sampling oscilloscopes, the sample rate (usually <1 MHz) is much lower than the signal rate, and therefore no more than a single sample is taken during any one particular signal zero-crossing. If the signal data is random or a pattern trigger is not available, the direction of the signal zero-crossing (up or down) is unknown and the time deviation is ambiguous. In addition, the sampling oscilloscope strobe is usually provided by either an asynchronous trigger or a frequency-synthesized periodic oscillator, either of which contribute at least 0.6 ps of rms jitter to the measurement. The additional 0.6 ps of rms jitter produces a significant impact on a 40 Gb/s measurement.

In addition, the low sampling rate in high speed electronic sampling oscilloscopes makes it impossible to analyze the time interval jitter between two nearby or adjacent zero-crossings. The time interval jitter is the deviation in the actual time interval between two nearby or adjacent measured zero-crossings from the ideal time interval between the two nearby or adjacent zero-crossings. Measuring the time interval jitter enables a frequency-domain or auto-correlation jitter analysis, such as the jitter analysis algorithm described in PCT International Application WO 99/39216 to Wilstrup et al. (hereinafter referred to as the Wavecrest technique), which is hereby incorporated by reference.

In Wilstrup et al., two trigger circuits are used to measure the time interval between two nearby or adjacent zero-crossings. Each trigger circuit is set to generate an output pulse upon the detection of a different zero-crossing in the signal. Circuitry connected to the two trigger circuits receives the two pulses and compares the timing of the two pulses to measure the time interval between the two pulses. The measured time interval is compared to the ideal time interval to determine the time interval jitter.

However, the time interval jitter measurement includes not only the jitter present in the signal, but also the jitter inherent within and between the two trigger circuits. At low frequencies, the inherent jitter within the two trigger circuits does not significantly effect the time interval jitter measurement. However, as signaling rates of serial communications signals increase, e.g. up to and above 40 Gb/s, the limited bandwidth, phase distortion and intrinsic jitter contribution of the two trigger circuits in Wilstrup et al. significantly distorts the measurement result. Thus, the jitter measurement system described in Wilstrup et al. does not provide an accurate time interval jitter analysis. Therefore, what is needed is a high data rate sampling apparatus for use in jitter analysis that is capable of providing plural samples within a single signal transition and reduces the effects of the inherent jitter present in the trigger circuit on the jitter measurement.

SUMMARY OF THE INVENTION

The present invention provides a sampling apparatus for use in high data rate jitter measurement systems based on offset sampling. A data signal is fed into two or more sampling circuits. At least one sampling strobe generates at least one output pulse to drive the two or more sampling circuits. One or more delay elements are provided to offset in time samples of the data signal produced by the two or more sampling circuits. The samples are used to determine the jitter associated with the data signal.

To determine the jitter associated with a zero-crossing of the data signal, the delay can be set to an amount that is less than the transition time of the data signal. To determine the time interval jitter associated with two zero-crossings of the data signal, the delay can be set to an integer multiple of the bit period of the data signal. In addition, both the zero-crossing direction and the zero-crossing time may be determined from the samples.

In one embodiment, one of the signal paths has a small delay as compared with the other signal path. In another embodiment, instead of delaying the input signal in one signal path, the sampling strobe itself is delayed towards one of the samplers. In a further embodiment, each sampling circuit has a separate sampling strobe, and the delay is provided towards one of the sampling strobes. In a still further embodiment, when using separate sampling strobes, offset samples of a reference clock signal are used to determine the phase and cycle number of the reference clock at the pulse time. The phase of the reference clock signal is used to determine the time of each of the samples, while the cycle number is used to determine the absolute time difference between the two samples.

Advantageously, offset sampling of the signal-under-test allows the direction (up or down) of a signal zero-crossing to be ascertained without prior knowledge of the direction, as well as to accurately extrapolate the zero-crossing time value. In addition, adjusting the offset between the two samples to an integer multiple of the bit period of the signal under test enables both sampling of adjacent zero-crossings spaced from one to many bit intervals apart and a determination of the time interval jitter between adjacent zero-crossings. Moreover, offset sampling using a single trigger circuit eliminates the trigger circuit jitter from the time interval jitter analysis. Likewise, when using multiple sampling strobes, offset reference clock sampling eliminates the jitter related to the sampling strobe and sampling event. As a further advantage, the sampling apparatus of the present invention applies to all optical, hybrid optical-electrical and electrical sampling implementations. Furthermore, the invention provides embodiments with other features and advantages in addition to or in lieu of those discussed above. Many of these features and advantages are apparent from the description below with reference to the following drawings.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS OF THE INVENTION

The numerous innovative teachings of the present application will be described with particular reference to the exemplary embodiments. However, it should be understood that these embodiments provide only a few examples of the many advantageous uses of the innovative teachings herein. In general, statements made in the present application do not necessarily delimit any of the various claimed inventions. Moreover, some statements may apply to some inventive features, but not to others.

Figure 1:
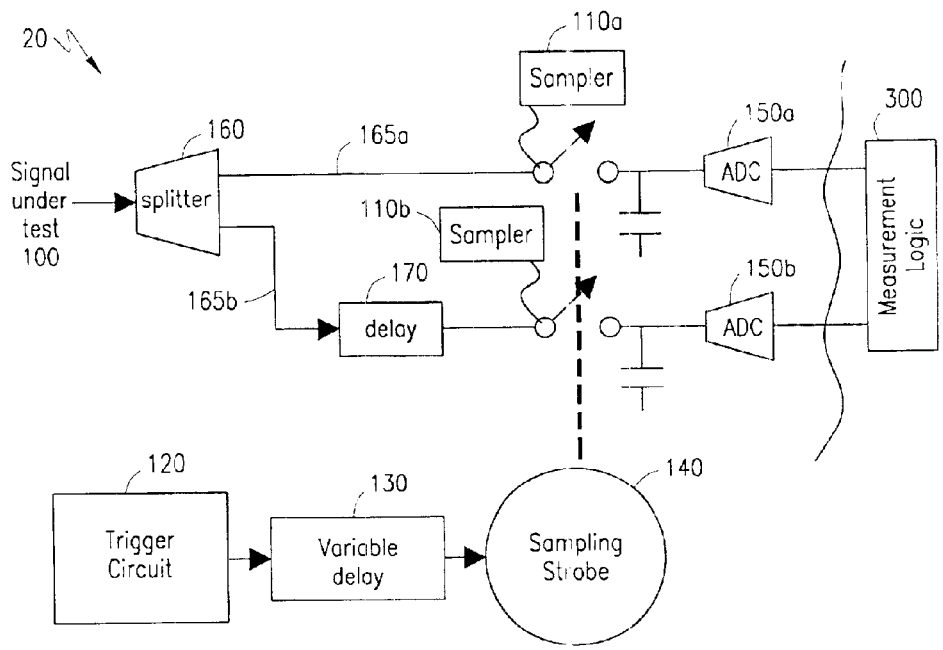
FIG. 1 illustrates an exemplary offset sampling apparatus using a delayed signal path in order to measure the jitter of a signal-under-test in accordance with the present invention.

FIG. 1 illustrates an offset sampling apparatus 20 in accordance with embodiments of the present invention. The offset sampling apparatus 20 can be used, for example, in high-speed optical or electronic sampling oscilloscopes, to measure waveforms and zero-crossings of a signal-under-test (SUT) 100. A zero-crossing refers to the time that the amplitude of the SUT crosses a decision threshold (e.g., one-half amplitude) during a transition (e.g., from a "one" logic level to a "zero" or vice-versa) of the SUT 100. The jitter associated with one particular zero-crossing of the SUT 100 is the deviation of the actual zero-crossing time from the ideal zero-crossing time. In addition, the SUT 100 is composed of signal transitions (zero-crossings) that are ideally spaced apart by an exact (integer) multiple of a fundamental time period (bit period) that is characteristic of the signal. The deviation in the actual time interval between two nearby or adjacent measured zero-crossings from the ideal time interval between the two nearby or adjacent zero-crossings is referred to as the time interval jitter in the SUT 100.

To measure the zero-crossing jitter (or time interval jitter) in the SUT 100 with arbitrary spacing (as small as one bit period), the SUT 100 is split by an optical or electrical splitter 160 and fed via separate signal paths 165a and 165b into two coupled samplers 110a and 10b, respectively. One signal path 165b has a delay element 170 thereon. To measure the jitter associated with a particular zero-crossing of the data signal, the delay can be set to an amount that is less than the transition time of the SUT (e.g., the delay can be set to 25–50% of the rise or fall time of the SUT 100). It should be understood that multiple samplers 110 may be used, each being delayed with respect to previous samplers to provide a more accurate determination of the direction and zero-crossing time. To measure the time interval jitter associated with two nearby or adjacent zero-crossings of the data signal, the delay can be set to an integer multiple of the bit period of the SUT 100 (e.g., the delay can be set to the approximate time interval between the two zero-crossings to be measured).

Therefore, signal path 165b (associated with a second sample) has a delay as compared with signal path 165a (associated with a first sample). The delay element 170 can be implemented with little degradation in signal quality by using, for example, a short length of an electrical transmission line, optical fiber or optical air-gap. Alternatively, the amount of the delay can be variable, depending upon the SUT 100. For example, the delay element 170 can be implemented using a variable optical path or variable electrical transmission line, either of which would maintain a low relative timing jitter between the samplers 110.

To provide two samples of the SUT 100, a trigger circuit 120 is set to sample the SUT 100 at a particular (or first) zero-crossing of the SUT 100. The trigger circuit 120 can be, for example, an asynchronous electronic comparator circuit that generates an output pulse upon the detection of a zero-crossing in a signal present at the input of the trigger circuit 120. In some cases, a specific form of trigger circuit, known as a pattern trigger, can be used. A pattern trigger circuit 120 generates an output pulse only when a specific zero-crossing in a repeating data pattern is detected. The pattern trigger circuit 120 typically includes a digital sequence comparison circuit and a programmable counter. With a pattern trigger circuit 120, the shape and direction (up or down) of the zero-crossing being measured is known. Therefore, the offset sampling apparatus 20 does not need to determine the direction of the zero-crossing when a pattern trigger circuit 120 is used.

However, if a pattern trigger circuit 120 is not used, and therefore, the delay 170 is set to less than the transition time of the SUT 100, the second, offset sample is used to determine the direction of the first sample that measures the actual zero-crossing. Since the amount of the delay is below either the rise or fall time of the SUT 100, both samples lie on the same slope of the SUT 100 (although one of the samples could be at or near the flat portion of the waveform), and the direction of the zero-crossing (first) sample with respect to the position of the decision threshold can be determined. In addition, if the two samples lie on either side of the zero-crossing, the zero-crossing time can also be determined from extrapolation.

The trigger circuit 120 is used along with a time-based variable delay 130 to align a sampling strobe 140 to the desired (or first) zero-crossing of the SUT 100. The sampling strobe 140 is a device or circuit that creates a sharp optical or electrical pulse that drives samplers 110a and 110b, and thereby precisely defines each sampling event (e.g., to <200 femtoseconds rms). The sampling strobe 140 may provide a single output pulse, or periodic output pulses. It should be understood that since the sampling strobe 130 is capable of defining the sampling event to less than 200 femtoseconds rms, by driving the samplers 110a and 110b from the same sampling strobe 130, the relative timing jitter between the samplers 100a and 100b is small.

In FIG. 1, the sampling strobe 140 is asynchronously triggered from the time-based variable delay 130. Alternatively, the sampling strobe can be a microwave or RF oscillator followed by a pulse sharpening circuit, or a mode-locked fiber laser that generates less than 1 picosecond optical pulses at a free-running repetition rate of 50 MHz. In these cases, the trigger circuit 120 and time-based variable delay 130 may be replaced by a phased-locked loop. However, it should be understood that the sampling strobe 140 can be any circuit or device capable of generating an output pulse to drive the samplers 110a and 110b.

Each of the samplers 110a and 110b can be an electrical diode bridge circuit to sample an electrical waveform, a photodiode followed by electrical diode bridge circuits to sample an optical waveform or an all-optical mixing crystal, such as a periodically-polled Lithium Niobate followed by photodiode detector. However, it should be understood that the samplers 110a and 110b can be any circuit or device capable of sampling the optical or electrical signal with high bandwidth and sensitivity.

The signal (sample) from each sampler 100a and 110b is supplied to a respective ADC 150a and 150b to convert the analog samples into digital output signals representative of the amplitude of the SUT 100 at each sample time. The digital samples are used by measurement logic 300 to measure the jitter of the SUT 100. In some embodiments, the measurement logic 300 includes using a processor (not shown), memory (not shown) and a stored software program (not shown). The measurement logic 300 can be included within the same device as the sampling apparatus 20, or can be included within a separate device connected directly or indirectly to the sampling apparatus 20.

An example of a jitter measurement system is described in U.S. Pat. No. 4,876,655 to Carlton et al., which is hereby incorporated by reference. For example, to determine the zero-crossing jitter in the SUT 100, the measurement logic 300 uses the second, offset sample to determine the direction of the zero-crossing sample (first sample). With knowledge of the direction, the measurement logic can convert the amplitude of at least the measured zero-crossing sample (first sample) of the SUT to the relative time of that amplitude on the transition of the SUT associated with the zero-crossing being measured through a look-up table, which can be derived from a smoothed version of the waveform plot of the ideal shape of the transition. Alternatively, the measurement logic 300 can convert the amplitude of the measured zero-crossing sample of the SUT to time through a simple linear approximation of the slope of the waveform (e.g., if the two samples lie on either side of the zero-crossing, the measurement logic 300 can convert both samples to time and determine the zero-crossing time from extrapolation). Once the digital zero-crossing sample is converted to time, the measurement logic 300 calculates the jitter between the measured zero-crossing time and the ideal zero-crossing time.

As another example, if the measurement logic 300 is calculating the time interval jitter between two adjacent or nearby zero-crossing, the measurement logic 300 calculates the difference between the two measured zero-crossing times to determine the measured time interval. The measurement logic 300 further calculates the difference between the measured time interval and an ideal time interval known by the measurement logic 300 to determine the time interval jitter in the SUT 100. Advantageously, since both zero-crossing measurements are taken based on a trigger provided by the same trigger circuit 120 and an output pulse provided by the same sampling strobe 140, any jitter in each measurement caused by the trigger circuit 120, variable delay 130 and/or sampling strobe 140 is the same, and therefore the trigger/delay/strobe jitter is effectively cancelled out in the time interval jitter measurement.

It should be noted that the trigger circuit input signal zero-crossings are designed to precede the SUT zero-crossings to account for the inherent delay in the trigger circuit 120, variable delay circuit 130, sampling strobe 140 and samplers 110a and 110b. For example, the triggering, strobe and sampling events typically require 24 nanoseconds. Therefore, the input (zero-crossing) to the trigger circuit 120 is at least 24 nanoseconds prior to the zero-crossing of the SUT 100 being measured. The variable-delay circuit 130 can be used to increase the delay beyond 24 nanoseconds to precisely synchronize the sampling event with the SUT zero-crossing being measured.

Figure 2:
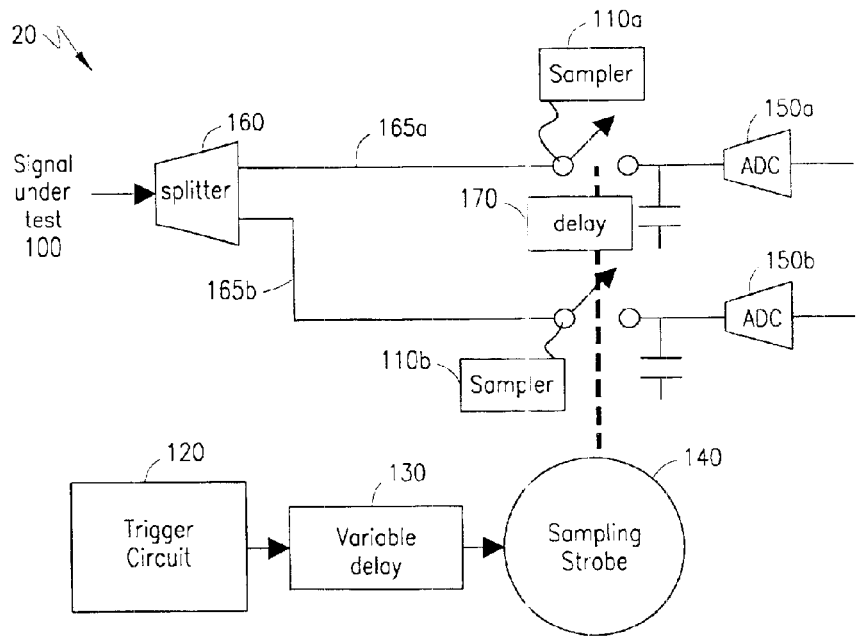
FIG. 2 illustrates an alternative exemplary offset sampling apparatus using a delayed sampler in accordance with the present invention.

FIG. 2 illustrates an alternative, but equivalent, offset sampling apparatus 20 to perform the same offset measurement as shown in FIG. 1. However, instead of delaying the SUT 100 in one signal path 165a or 165b, the sampler strobe 130 itself is delayed by providing the delay element 170 in the path carrying the output pulse from the sampling strobe 130 to samplers 110a and 110b. The delay element 170 is located between sampler 110b and 110a to delay only one of the actual sampling times (that associated with sampler 110a). Therefore, in FIG. 5, the sample produced by sampler 110b is associated with the zero-crossing being measure (or a first zero-crossing of the SUT 100), and the sample produced by sampler 110a is used to determine the direction of the zero-crossing being measured (or is associated with a second zero-crossing of the SUT). As in FIG. 1, the delay element 170 can be implemented by using, for example, a fixed short length of a transmission line, or alternatively, a variable length transmission line.

Figure 3A:
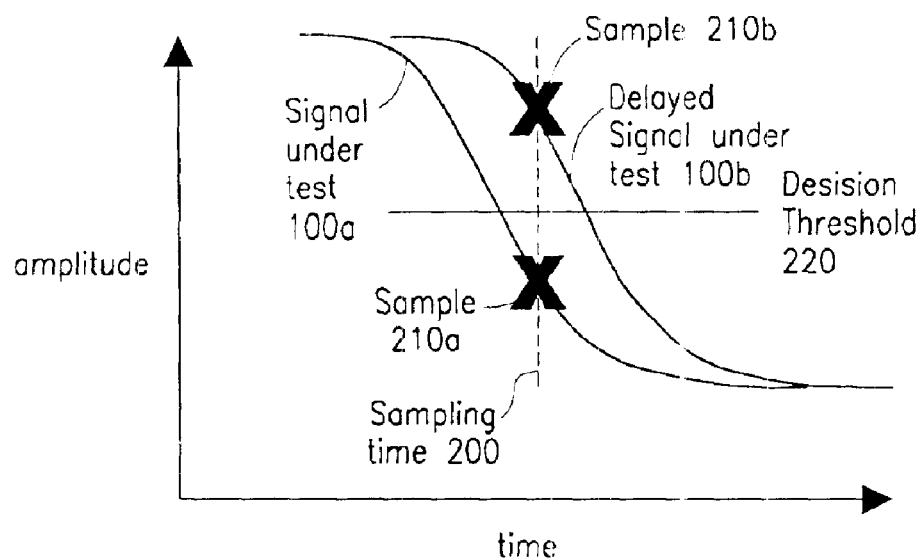
FIGS. 3A and 3B are graphs showing two samples taken by the offset sampling apparatus of FIG. 1 in the downward direction in order to determine the zero-crossing time and the direction of the zero-crossing for zero-crossing jitter measurements.
Figure 3B:
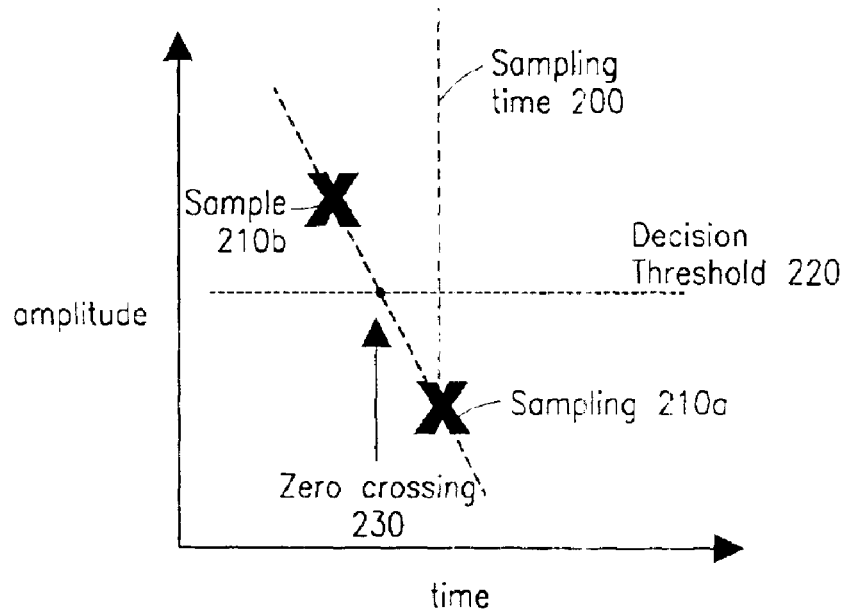

FIGS. 3A and 3B are graphs illustrating the determination of the zero-crossing direction and the zero crossing time from the amplitude values measured by the offset sampling apparatus shown in FIG. 1. The SUT 100a and delayed SUT 100b are both sampled at the same real sampling time 200 to produce samples 210a and 210b, respectively. However, as can be seen in FIG. 3B, the time of sample 210b is effectively offset from the time of sample 210a, allowing a determination of the direction of the zero-crossing, and possibly a determination of the zero-crossing time 230 from extrapolation of the two samples 210a and 210b (amplitude values). In FIGS. 3A and 3B, the delayed SUT 100b amplitude (sample 210b) is higher than the SUT 100a amplitude (sample 210a), and therefore, the zero-crossing SUT amplitude measurement (sample 210a) is associated with the downward transition direction. Although not shown, if the delayed SUT 100b amplitude (sample 210b) is lower than the SUT 100a amplitude (sample 210a), the zero-crossing SUT amplitude measurement (sample 210a) would be associated with the upward transition direction.

Figure 4:
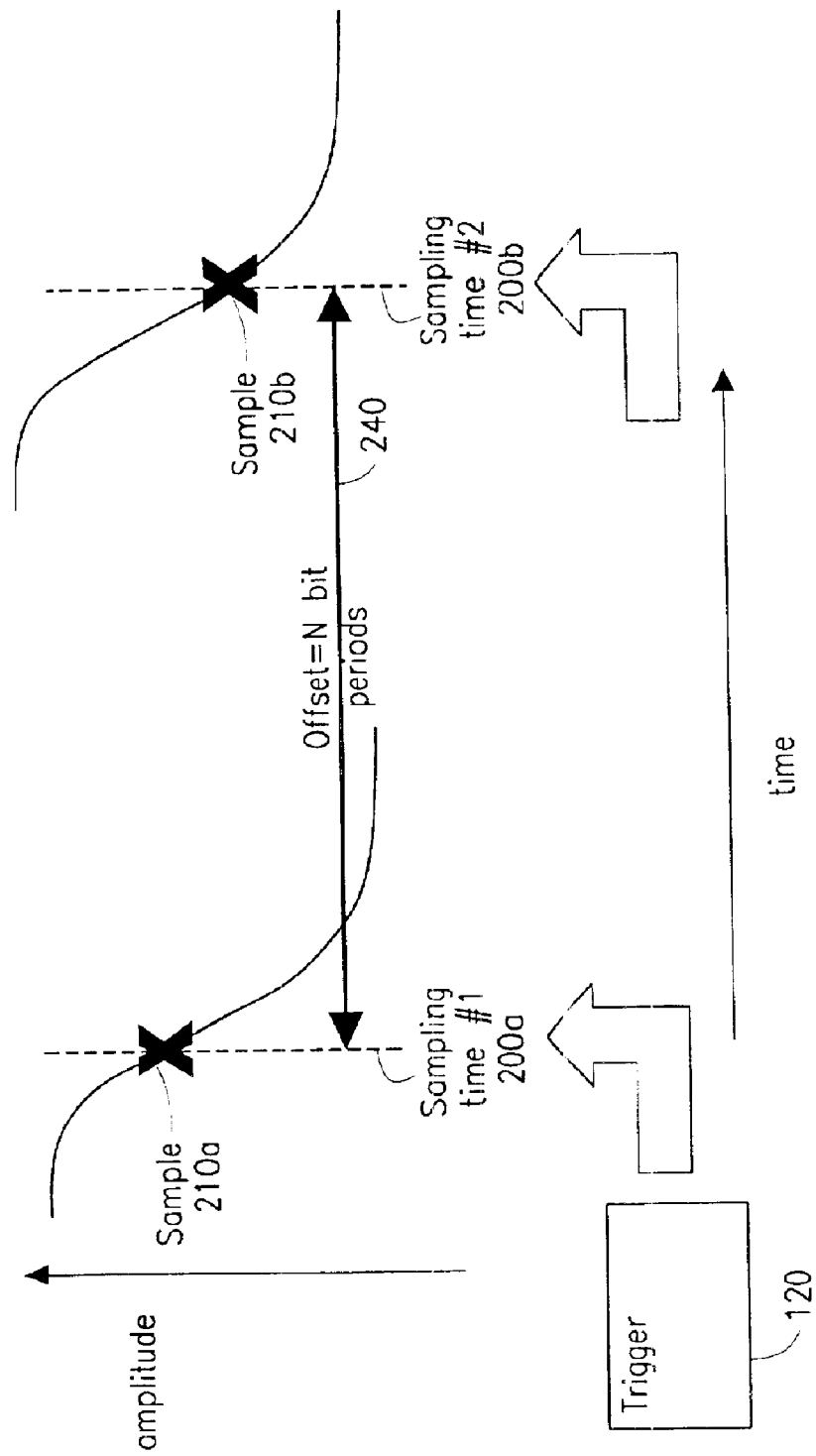
FIG. 4 is a chart showing two samples taken by the offset sampling apparatus of FIG. 2 in order to determine the time interval jitter between two zero-crossings.

FIG. 4 is a chart illustrating two samples (samples 210a and 210b) taken by the offset sampling apparatus 20 of FIG. 2 in order to determine the time interval jitter between two zero-crossings. The two samples 210a and 210b are taken at different actual sampling times 200a and 200b due to the delay element 170 being present in the line carrying the pulse generated by the strobe 130. However, it should be understood that the following description applies equally to samples taken by the offset sampling apparatus of FIG. 1, having offset samples taken at the same sampling time. The delay in the offset sampling apparatus produces an offset 240 of N bit periods corresponding to the time interval between the two zero-crossings being measured.

In FIG. 4, it is assumed that the direction of the zero-crossing is known from the pattern trigger. Therefore, the relative time of each sample 210a and 210b on each transition of the SUT being measured can be easily calculated. Thereafter, the time associated with one sample 210b can be subtracted from the time associated with the other sample 210a to yield the measured time interval. The time interval jitter is determined by taking the difference between the measured time interval and an ideal time interval, and this time interval jitter information can be used to perform a jitter analysis.

Figure 5:
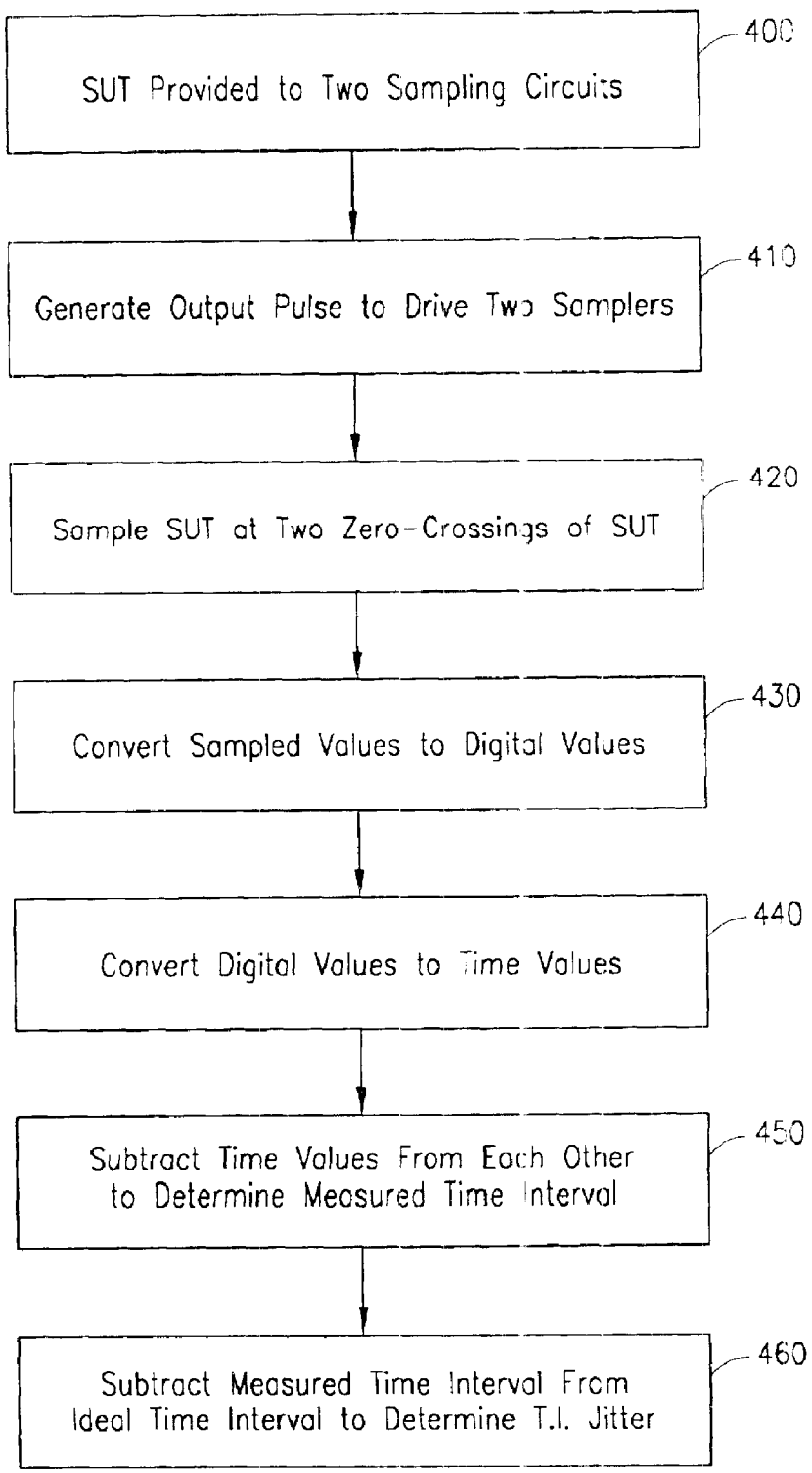
FIG. 5 is a flowchart illustrating the steps for measuring the time interval jitter between two nearby or adjacent zero-crossings of a signal-under-test using the offset sampling apparatus of FIG. 1 or FIG. 2.

FIG. 5 is a flowchart illustrating the steps for measuring the time interval jitter between two nearby or adjacent zero-crossings of a signal-under-test using the offset sampling apparatus of FIG. 1 or FIG. 2. The SUT is provided to two different samplers or sampling circuits (step 400). Upon the generation of an output pulse to drive the two samplers (step 410), two zero-crossings of the SUT are measured by introducing a delay corresponding to an integer multiple of the bit period of the SUT towards one of the samplers (step 420). The amplitude values of the two measured zero-crossings are converted to digital amplitude values (step 430), and each digital amplitude value is converted to a time associated with the measured digital amplitude value on the transition associated with the respective zero-crossings being measured (step 440). The two time values are subtracted from each other to produce a measured time interval between the two zero-crossings (step 450). The measured time interval and an ideal time interval for the two zero-crossings are subtracted from each other to produce a time interval jitter value (step 460).

Figure 6:
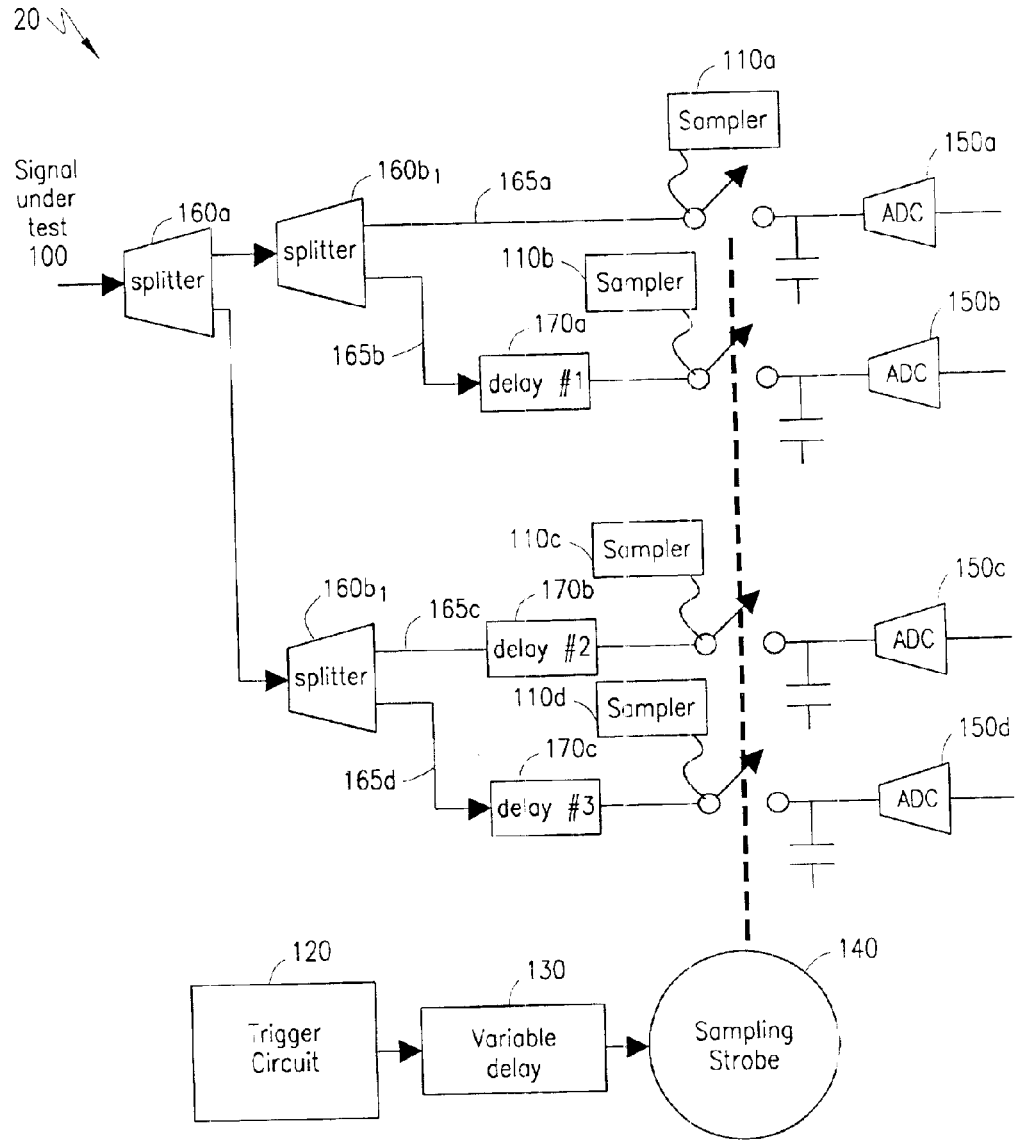
FIG. 6 illustrates an extended offset sampling apparatus in accordance with embodiments of the present invention.

FIG. 6 illustrates an extended offset sampling apparatus 20 that both determines the zero-crossing direction and measure time intervals for time interval jitter analysis. In FIG. 6, the SUT 100 is split by a first splitter 160a and fed to two additional splitters $160b_1$ and $160b_2$. The first additional splitter $160b_1$ splits the SUT into two separate signal paths 165a and 165b, in which one of the signal paths 165b has a delay (first delay element 170a) as compared to the other signal path 165a. The first delay element 170 can be implemented, for example, as a short length of a transmission line, a variable optical path or a variable electrical transmission line. The first delay element 170 ensures that the second sample of a first zero-crossing provided by the second sampler 100b of the SUT 100 is offset in time from the first sample of the first zero-crossing provided by the first sampler 100a. The second, offset sample of the first zero-crossing is used to determine the direction of the first zero-crossing time measured by the first sampler 110a.

The second additional splitter $160b_2$ is associated with a second zero-crossing nearby the first zero-crossing. The second additional splitter $160b_2$ splits the SUT 100 into two additional separate signal paths 165c and 165d, each having a different delay (second delay element 170b and third delay element 170c, respectively) associated therewith. The amount of the second delay element 170b is set to an integer multiple of the bit period of the SUT 100 (e.g., the delay can be set to the approximate time interval between the two zero-crossings to be measured). The sample provided by the third sampler 100c is used, along with the sample provided by the first sampler 110a, to determine the time interval jitter between the first and second zero-crossings in the SUT 100. The third delay element 170c is similar to the first delay element 170a, in that it serves to delay the SUT 100 to the fourth sampler 100d in order to determine the direction of the second zero-crossing. The differential delays presented to each pair of samplers do not have to be substantially equivalent, so long as each differential delay is below either the rise or fall time of the SUT 100 so that both pairs of samples (e.g., first and second samples or third and fourth samples) lie on the same slope of the SUT 100.

The signals from each of the samplers 110a–110d are provided to respective ADC's 150a–150d for digital processing and the determination of the jitter in the zero-crossing and the time-interval jitter between two zero-crossings. It should be understood that although the delay elements 170a–170c are shown implemented in accordance with FIG. 1, the delay elements 170a–170c can also be implemented in accordance with FIG. 2, without any significant effect on the jitter analysis.

Figure 7:
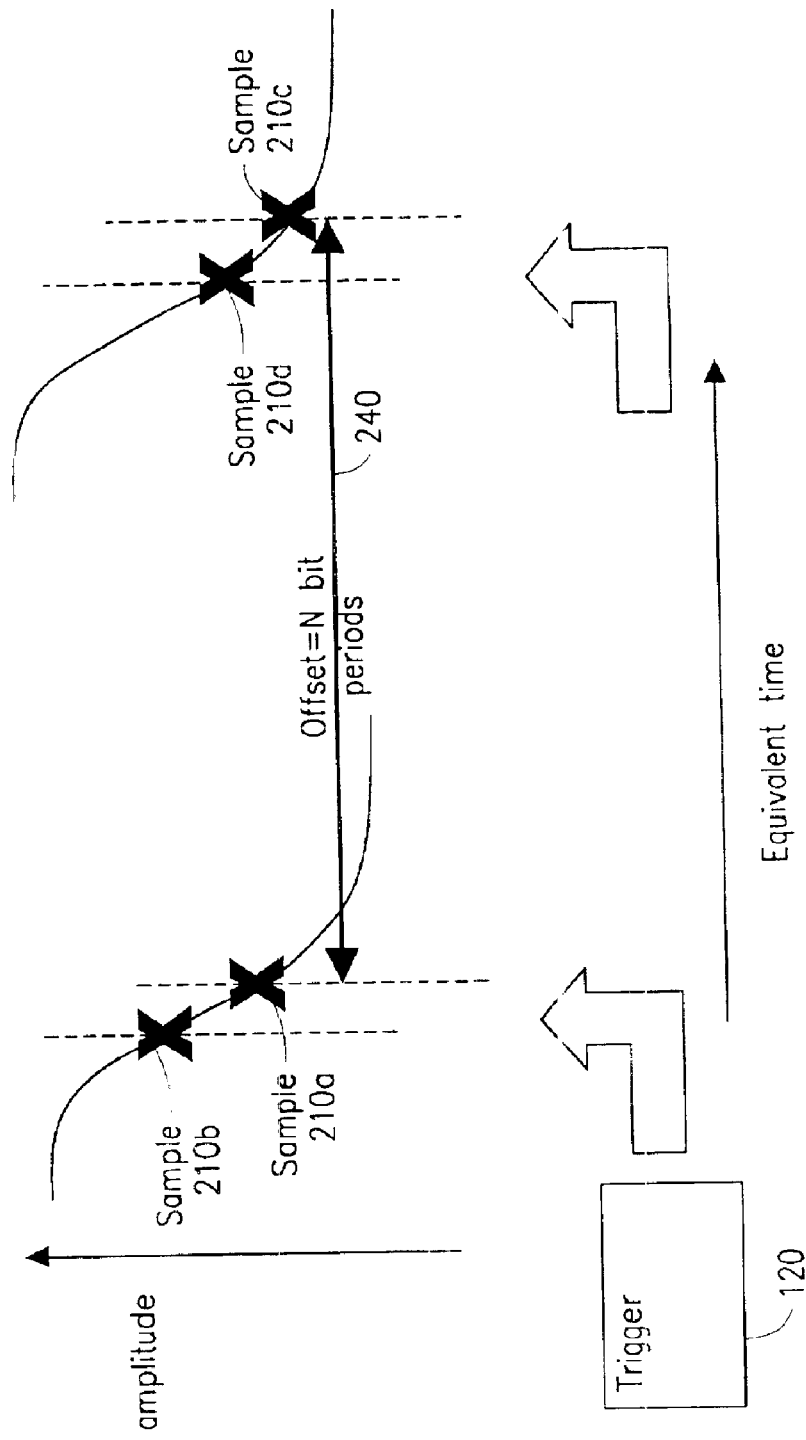
FIG. 7 is a chart showing four samples taken by the extended offset sampling apparatus of FIG. 6 in order to determine both the direction of two zero-crossings and the time interval jitter between the two zero-crossings.

FIG. 7 is a chart showing four samples 210a–210d taken by the extended offset sampling apparatus of FIG. 6 in order to determine both the direction of the two zero-crossings and the time interval jitter between the two zero-crossings. The first zero-crossing is sampled (samples 210a and 210b) at two effective offset times to determine the direction of the zero-crossing, and the second zero-crossing is sampled (samples 210c and 210d) at two effective offset times to determine the direction of the second zero-crossing. The pairs of samples (210a/210b and 210c/210d) are offset 240 from each other by N bit periods corresponding to the time interval between the two zero-crossings being measured. Once the direction of both the first and second zero-crossings are known, the zero-crossing times can either be extrapolated from the samples (210a and 210b or 210c and 210d) or determined using a look-up table or slope analysis. From the measured zero-crossing times, the jitter in each zero-crossing measurement can be determined. Thereafter, the time interval jitter can be calculated by subtracting one jitter value from the other.

Figure 8:
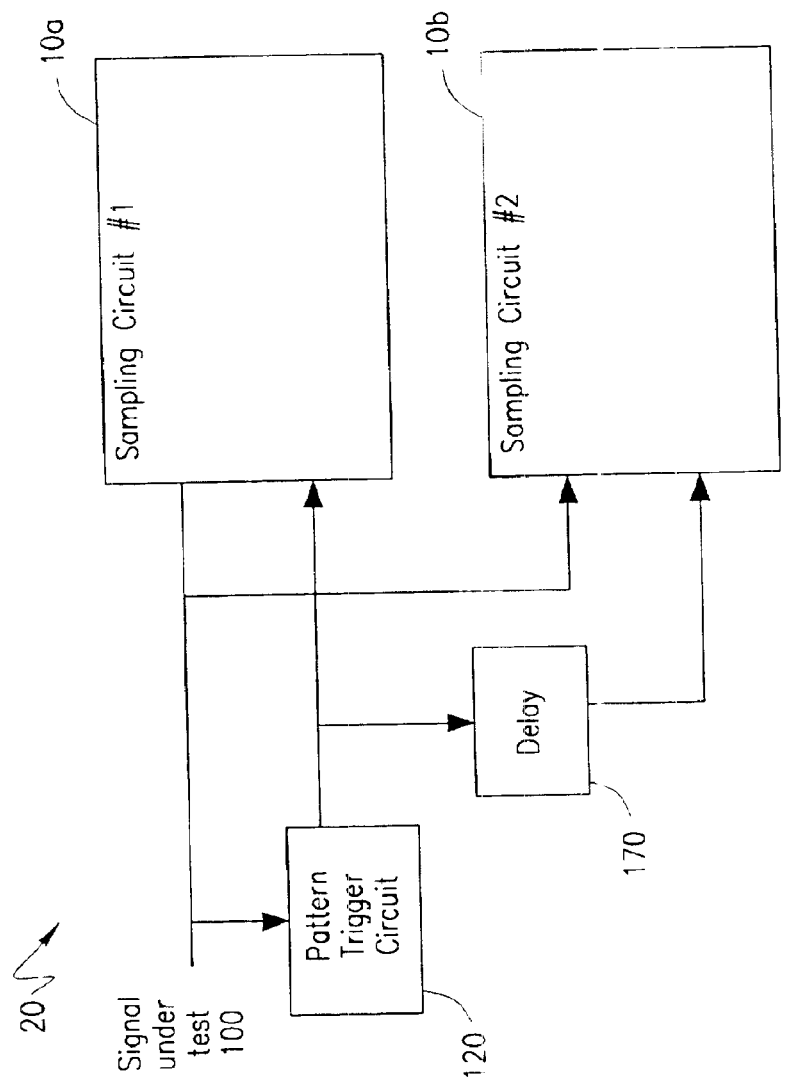
FIG. 8 illustrates another alternative exemplary offset sampling apparatus using a delayed trigger in accordance with the present invention.

For time intervals between zero-crossings exceeding about 1 nanosecond, it is impractical to employ physical delay lines to achieve the offset delay due to loss, dispersion and difficulty in adjusting the delay. Therefore, another delay technique is needed to measure larger time intervals. FIG. 8 illustrates an offset sampling apparatus 20 that includes two sampling circuits 10a and 10b. As used herein, a sampling circuit 10 refers to a circuit having a single sampler 110 (shown in FIG. 1). In FIG. 8, each sampling circuit 10a and 10b also includes at least a variable delay 130 (shown in FIG. 1), sampling strobe 140 (shown in FIG. 1), and ADC 150 (shown in FIG. 1). Both sampling circuits 10a and 10b are triggered from a common trigger circuit 120, but the second sampling circuit 10b trigger is delayed. The delay element 170 can be set to as little as one bit period, since the two sampling circuits 10a and 10b are distinct, each having a separate sampling strobe 140.

A preferred implementation for the delay element 170 is a digital timer circuit. The digital timer circuit delays the output pulse from the trigger circuit 120 towards the second sampling circuit 10b by a prescribed amount of time or clock cycles. For example, the digital timer circuit can be implemented by a programmable counter using a fixed reference clock frequency. The input to the digital timer circuit starts the counter, and when the counter times out, the trigger (output pulse from the trigger circuit 120) is applied to the second sampling circuit 10b.

Figure 9:
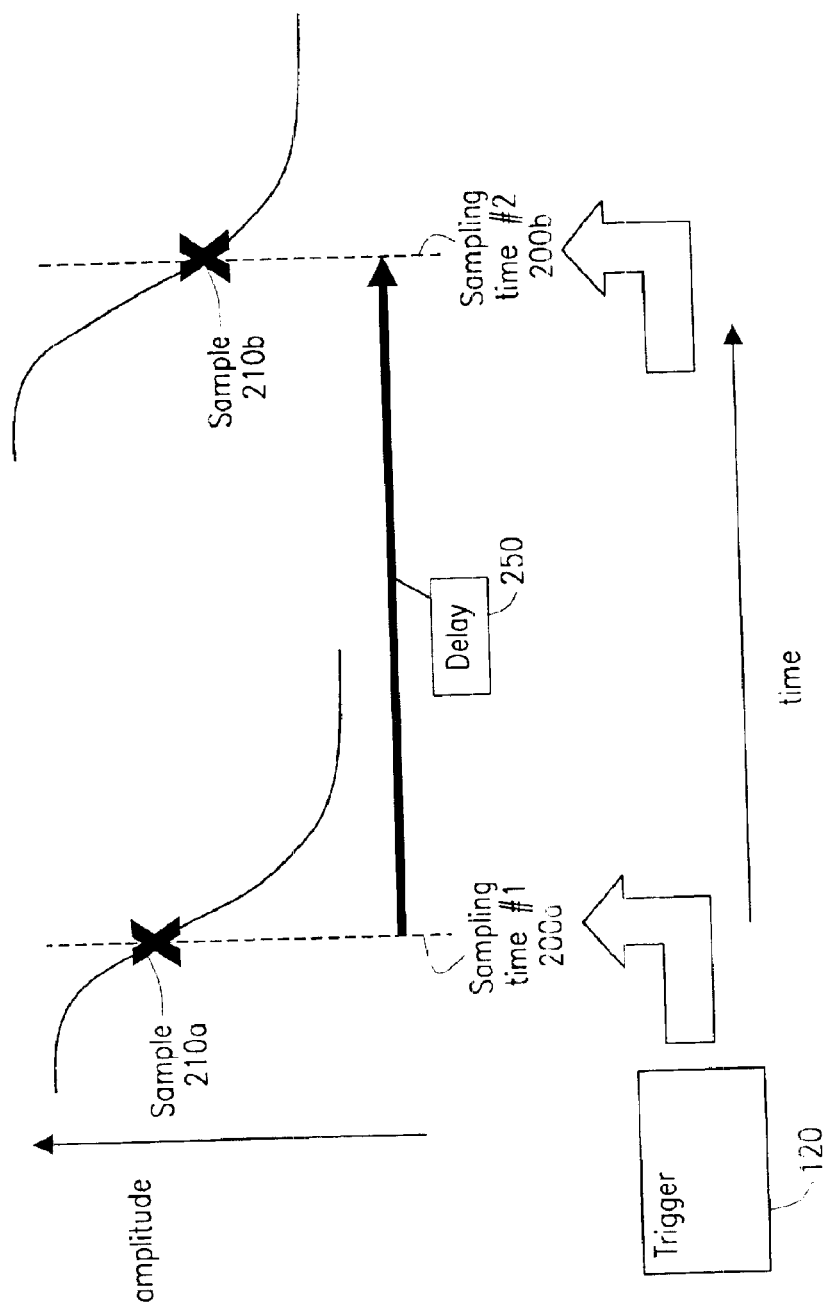
FIG. 9 is a chart showing two samples taken by the offset sampling apparatus shown in FIG. 6 in order to determine the time interval jitter between two zero-crossings.

In FIG. 8, the trigger circuit 120 is preferably a pattern trigger circuit, so that the direction of the zero-crossing is known. The SUT 100 is provided to both sampling circuits 10a and 10b at the same time. However, each sampling circuit 10a and 10b has a separate sampling strobe, and the sampling strobe of the second sampling circuit 10b is triggered at a delayed time as compared to the sampling strobe within the first sampling circuit 10a. As shown in FIG. 9, since the two samples 210a and 210b are taken at different real sampling times 200a and 200b, there is a real delay 250 from the time that the first sample 210 is taken and the time that the second sample 210b is taken. With knowledge of the direction of the zero-crossings, the time of each zero-crossing measurement can be determined, and the time interval jitter can be calculated from the two measured time values.

Figure 10:
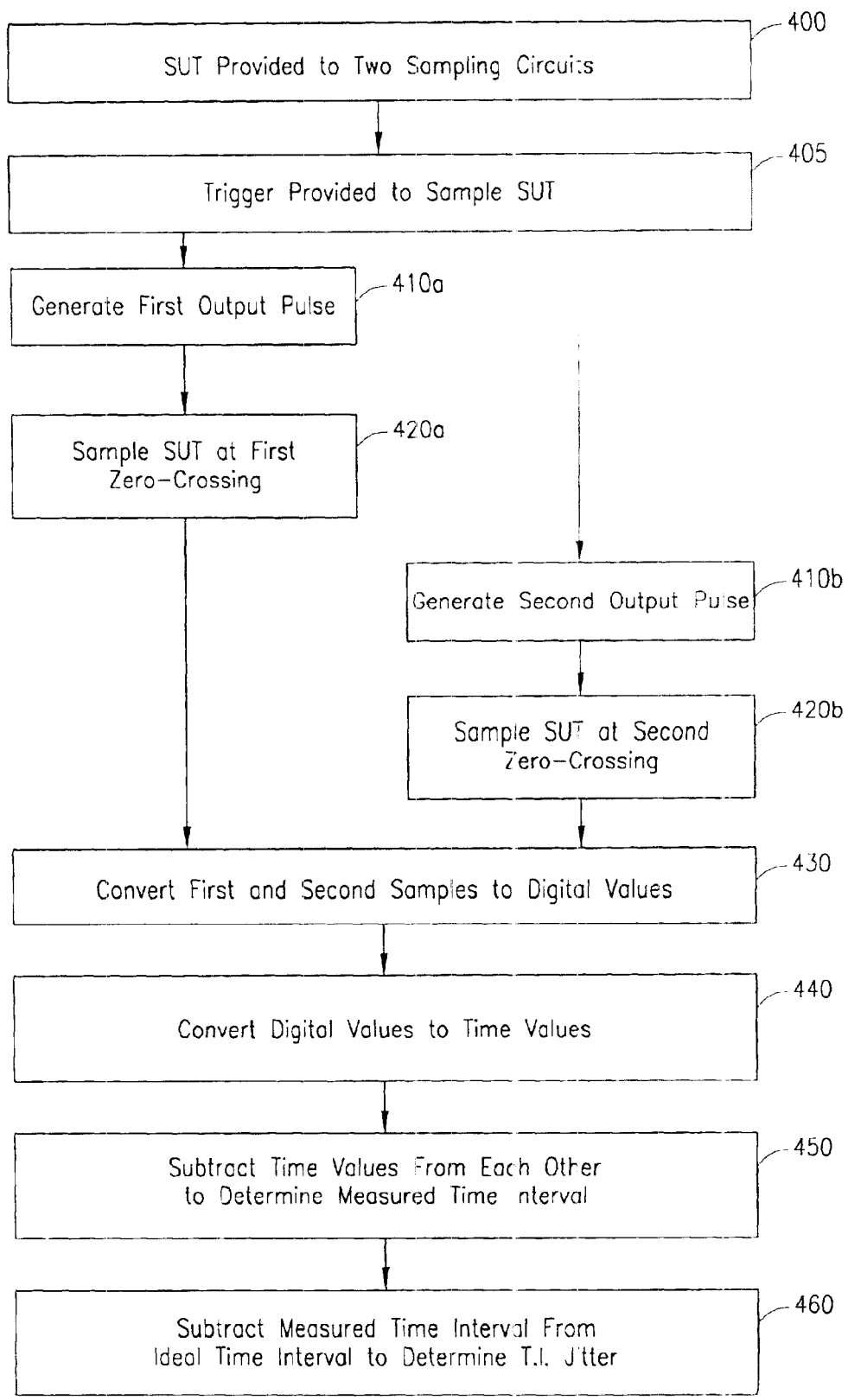
FIG. 10 is a flowchart illustrating the steps for measuring the time interval jitter between two nearby or adjacent zero-crossings of a signal-under-test using the offset sampling apparatus of FIG. 8.

FIG. 10 is a flowchart illustrating the steps for measuring the time interval jitter between two nearby or adjacent zero-crossings of a signal-under-test using the offset sampling apparatus of FIG. 8. The SUT is provided to two sampling circuits (step 400), and a trigger is provided to sample the SUT at two nearby or adjacent zero-crossing times by delaying the trigger towards one of the sampling circuits (step 405). The trigger causes an output pulse to be generated to one of the sampling circuits (step 410a) to sample a first zero-crossing of the SUT (step 420a), and the delayed trigger causes an output pulse to be generated to the other sampling circuit (step 410b) to sample a second zero-crossing of the SUT (step 420b). Thereafter, the amplitude values of the two measured zero-crossings are converted to digital amplitude values (step 430), and each digital amplitude value is converted to a time associated with the measured digital amplitude value on the transition associated with the respective zero-crossings being measured (step 440). The two time values are subtracted from each other to produce a measured time interval between the two zero-crossings (step 450). The measured time interval and an ideal time interval for the two zero-crossings are subtracted from each other to produce a time interval jitter value (step 460).

Although the jitter produced by the use of two separate sampling strobes is small compared to the jitter produced by two separate trigger circuits (as was done in the prior art Wavecrest jitter analysis method), the time interval jitter measurement results from FIG. 8 are still subject to strobe jitter. One known method of compensating for jitter is described in commonly assigned co-pending U.S. application Ser. No. 09/919,155 to Jungerman, which is hereby incorporated by reference. The Jungerman reference discusses sampling the reference clock to calculate the effective sampling time relative to the reference clock. The effective sampling time is used to place the measured amplitude values on the time axis of the oscilloscope display. Since the reference clock measurement typically has the same trigger jitter as the sampled value, the jitter determined by the effective sampling of the reference clock can be subtracted off of the time associated with the measured amplitude value to determine the true measurement time.

Figure 11:
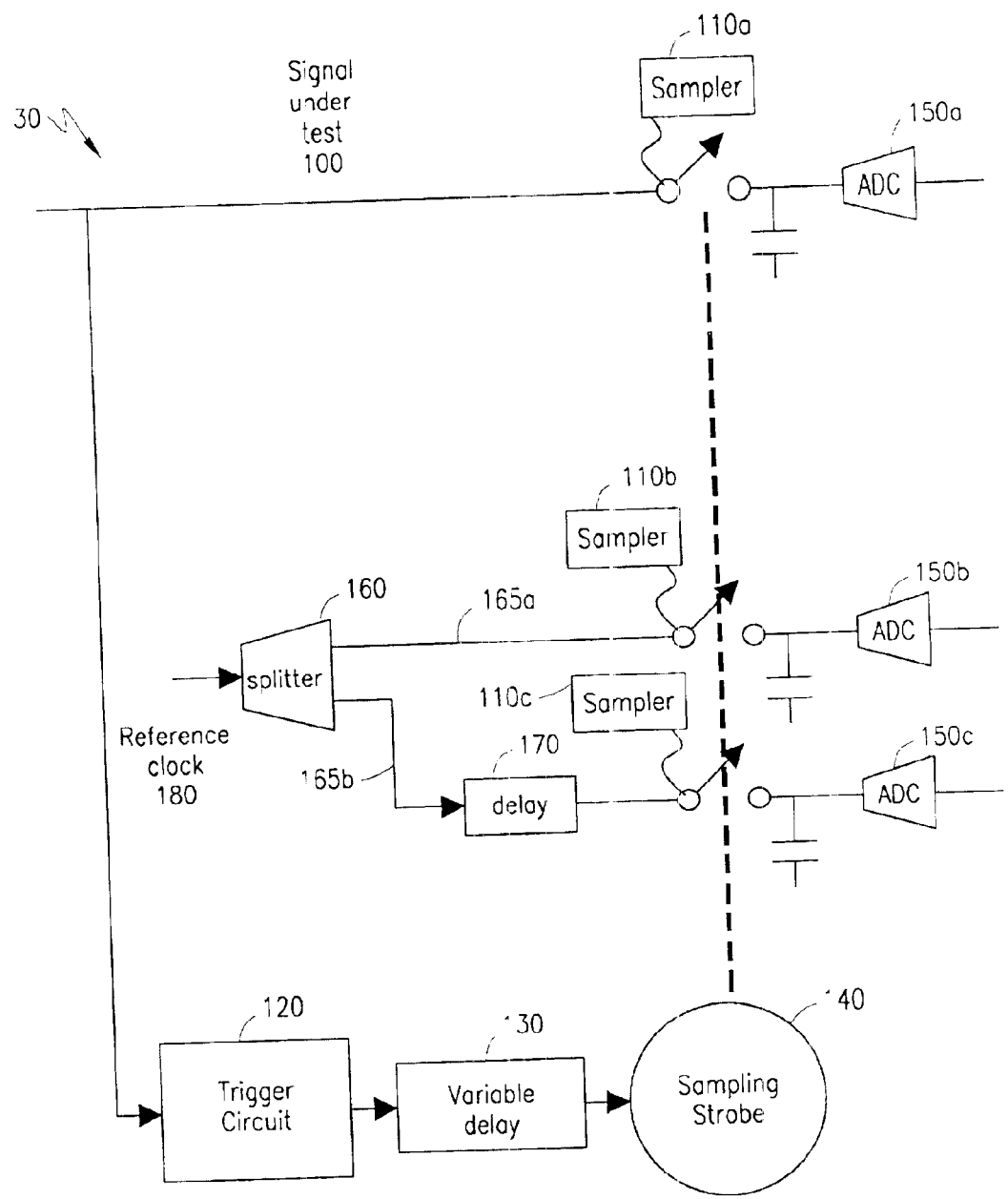
FIG. 11 illustrates a sampling apparatus that uses offset samples of a reference clock signal to determine the phase of the reference clock at the sampling time.

Extending this concept to the present invention, as shown in FIG. 11, an offset reference clock sampling apparatus 30 can be configured to take two offset samples of a reference clock 180 with the main strobe 140 to determine the phase of the reference clock 180 at the strobe time. The reference clock signal 180 is generally filtered to be sinusoidal. The reference clock signal 180 is split by a splitter 160 into two separate signal paths 165a and 165b, one signal path 165b of which is delayed (delay element 170) with respect to the other signal path 165a. The offset delay element 170 is preferably to set to 90 degrees in order to provide two reference clock samples in quadrature. The phase (a fine resolution time measurement) can be determined by performing a four quadrant arc-tangent computation on the two sampled reference clock values. Alternatively, a 90 degree hybrid coupler can be used instead of the splitter 160 and delay element 170 to the offset the sampling of the reference clock 180. A 90 degree hybrid coupler is a passive coupled microwave transmission line structure that effectively feeds the reference clock 180 into two separate paths with a 90 degree phase difference between the paths.

Figure 12:
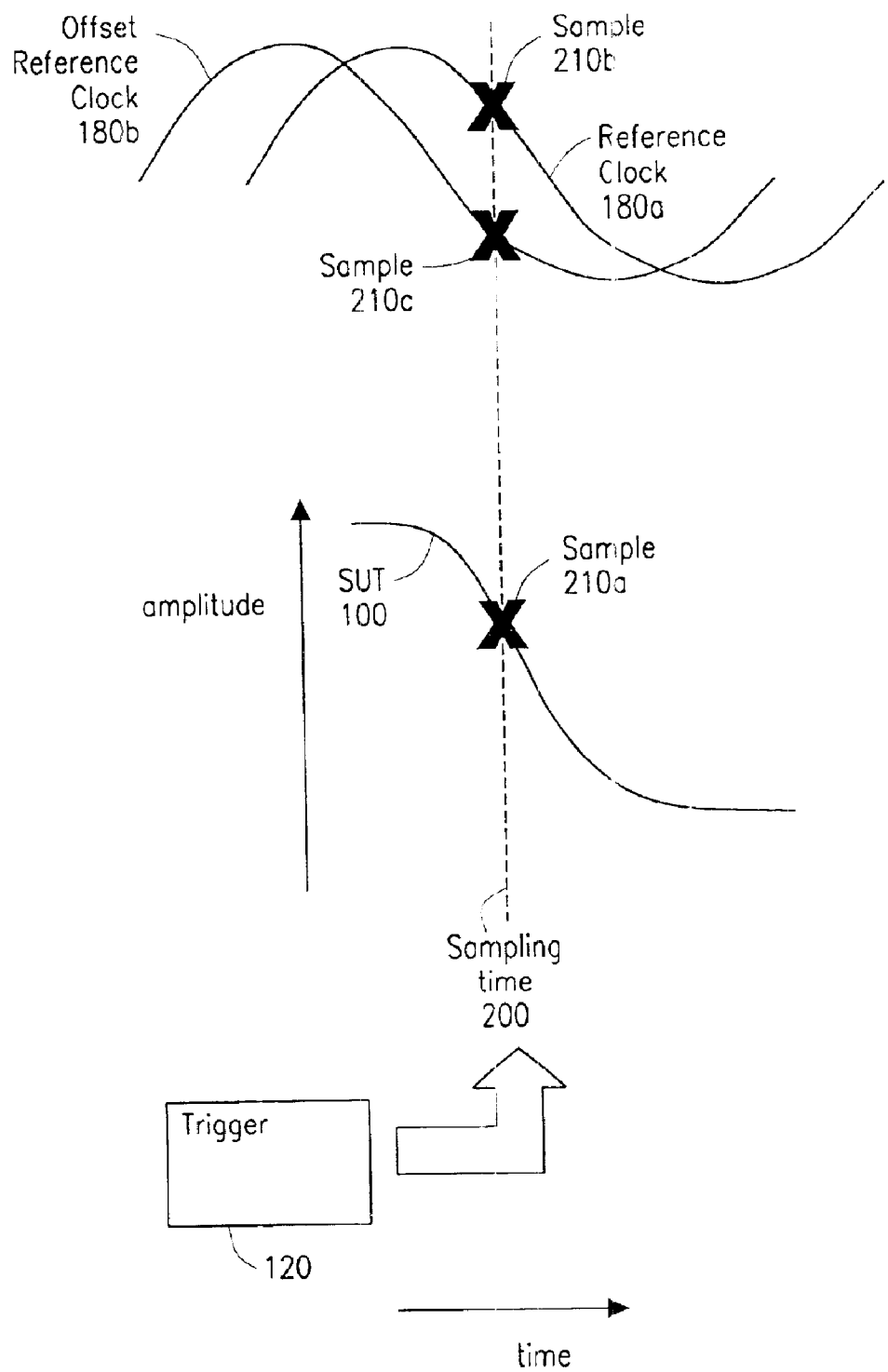
FIG. 12 is a chart showing two reference clock samples taken by the sampling apparatus shown in FIG. 11.

FIG. 12 is a chart showing two reference clock samples 210b and 210c and an SUT sample 210 taken at the same sampling time 200 by the offset reference clock sampling apparatus 30 shown in FIG. 11 in order to cancel out the jitter present in the strobe circuits. The true time of the zero-crossing measurement (determined from sample 210a) of the SUT is calculated by subtracting off the reference clock phase from the determined time of the zero-crossing. For example, the following equation can be used to eliminate the trigger/strobe jitter:

SUT ST–RC Phase=True SUT Z–C Time–True RC Z–C Time, where ST is the actual sampling time 200a of the sample 210a, RC refers to the reference clock and Z-C refers to the zero-crossing. Therefore, the phase of the offset reference clock measurements (samples 210b and 210c) is used to time-stamp the sampling event.

Figure 13:
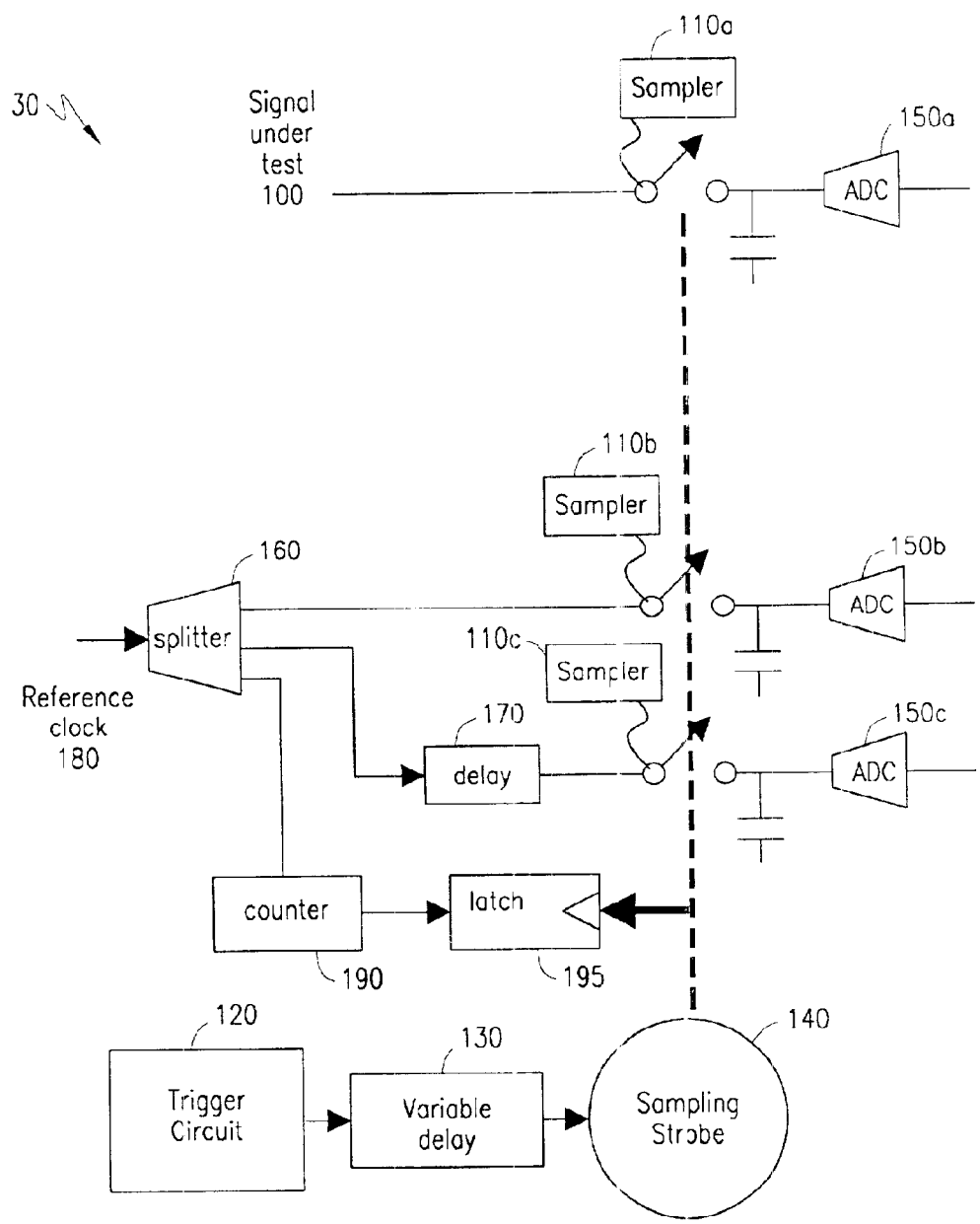
FIG. 13 illustrates an alternative offset reference clock sampling apparatus that uses offset samples of a reference clock signal to determine the phase and cycle number of the reference clock at the sampling time.

FIG. 13 illustrates an alternative offset reference clock sampling apparatus 30 in accordance with embodiments of the present invention. A counter 190 and strobed latch 195 are added to the offset reference clock sampling apparatus 30 to provide a clock reference cycle count for a coarse calculation of time. The counter 190 counts the number of cycles of the reference clock 180 from the time of the trigger signal and the latch 195 latches the counted number of cycles upon receipt of the strobe 130 signal.

It should be understood that further alternative reference clock implementations may be used instead of the specifically described implementation in FIGS. 11 and 13. For example, the delay may be implemented in the strobe path, as in FIG. 2, instead of on the signal path to the sampler. As another example, a simplified reference clock implementation may eliminate the second offset sampling of the reference clock. The reference clock phase is determined using an arc-sin function instead of the four quadrant arc tangent function described above.

Figure 14:
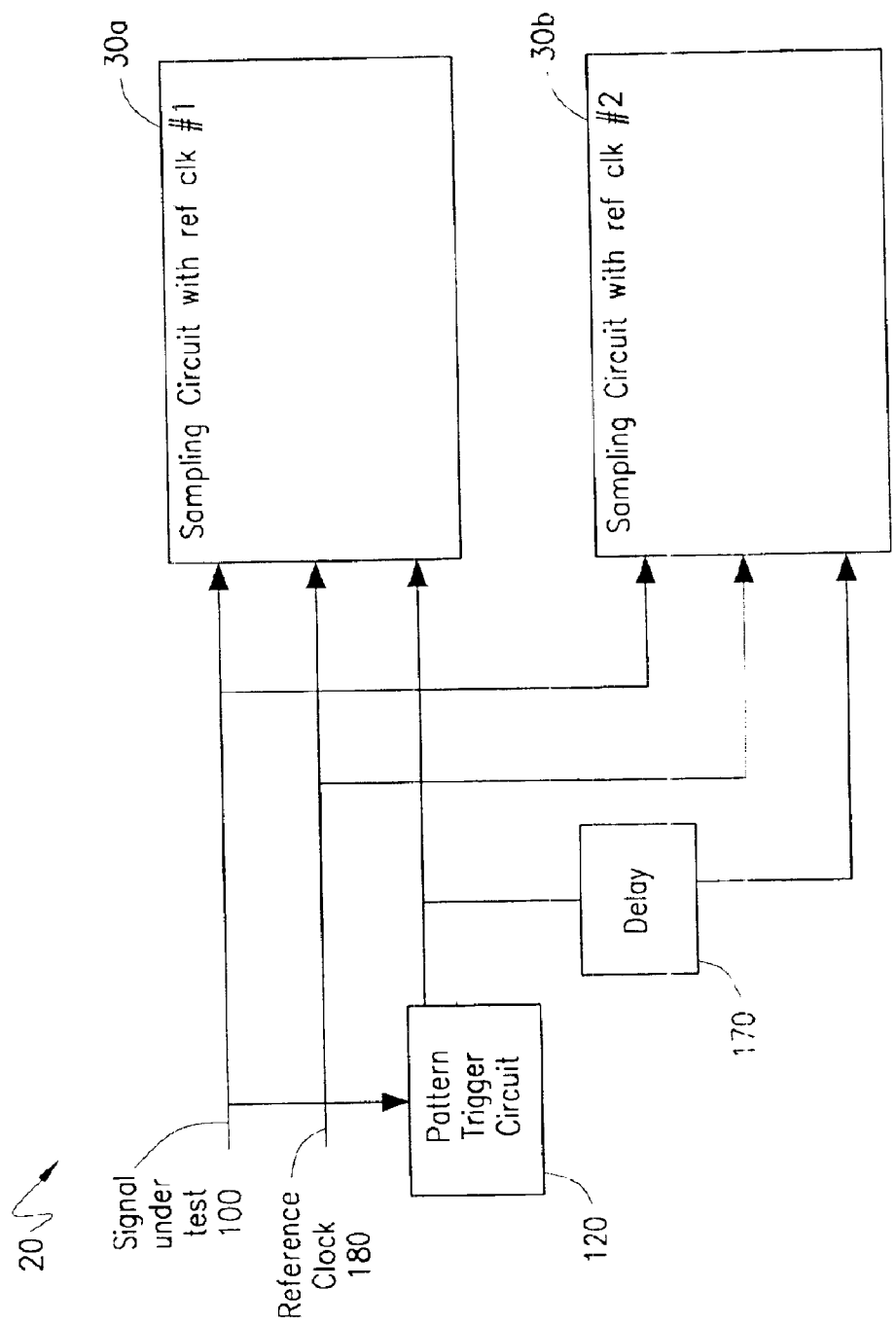
FIG. 14 illustrates the delayed trigger offset sampling apparatus of FIG. 8 in conjunction with the offset reference clock sampling apparatus of FIG. 13 in accordance with embodiments of the present invention.

Referring now to FIG. 14, the number of reference clock cycles can be used to determine the absolute time difference between two separate zero-crossing measurements. FIG. 14 illustrates the delayed trigger offset sampling apparatus 20 of FIG. 8 in conjunction with the offset reference clock sampling apparatus 30 of FIG. 13. The SUT 100 is applied to each of the offset reference clock sampling circuits 30a and 30b, and a pattern trigger circuit 120 delays the trigger of the sampling strobe in the second offset reference clock sampling circuit 30b by a known delay, produced by delay element 170, corresponding to the approximate time interval between the two zero-crossings to be measured. Each offset reference clock sampling circuit 30a and 30b measures a different zero-crossing, as in FIG. 6, and each offset reference clock sampling circuit 30a and 30b determines a different reference clock phase.

When the first offset reference clock sampling circuit 30a is triggered, a first zero-crossing of the SUT 100 and two offset reference clock signals produced by the reference clock 180 are substantially simultaneously sampled, and the reference clock cycle count for the first offset reference clock sampling circuit 30a is latched and read. Later, when the second offset reference clock sampling circuit 30b is triggered, a second zero-crossing of the SUT 100 and two additional offset reference clock signals produced by the reference clock 180 are substantially simultaneously sampled, and the reference clock cycle count for the second offset reference clock sampling circuit 30b is latched and read.

Figure 15:
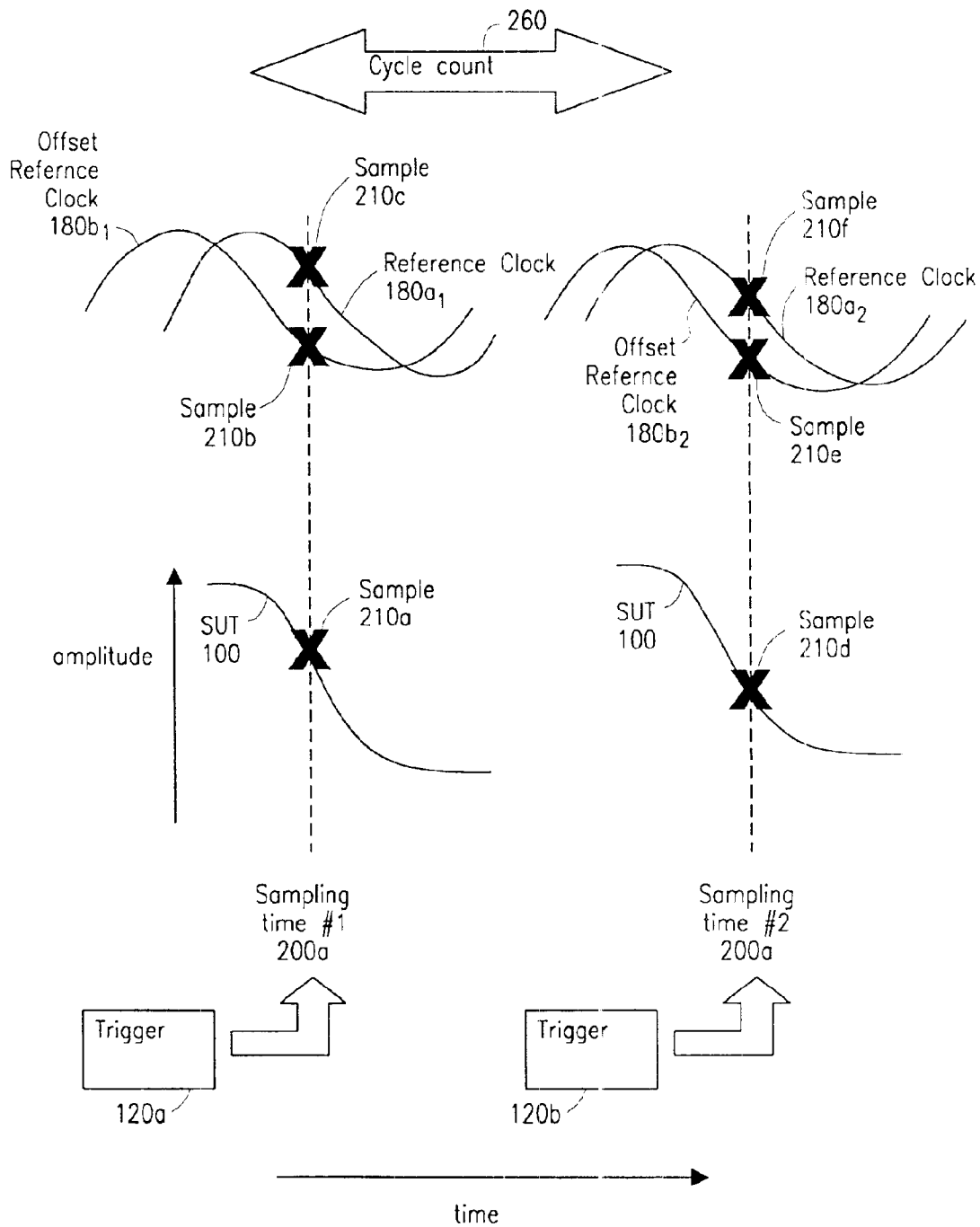
FIG. 15 is a chart showing four reference clock samples taken by the offset sampling apparatus of FIG. 14, along with the cycle count in order to determine the absolute time interval between two zero-crossings.

As shown in FIG. 15, the phase of the reference clock of the first sampling circuit (determined by the samples 210b and 210c taken from the true reference clock signal $180a_1$ and offset reference clock signal $180b_1$, respectively) is subtracted off of the determined time of first zero-crossing (determined from sample 210a taken at sampling time 200a) to determine the true time of the first zero-crossing. The phase of the reference clock of the second sampling circuit (determined by the samples 210e and 210f taken from the true reference clock signal $180a_2$ and offset reference clock signal $180b_2$, respectively) is subtracted off of the determined time of the second zero-crossing (determined from sample 210d taken at sampling time 200b) to determine the true time of the second zero-crossing.

Thereafter, the latched number of clock cycles in each sampling circuit are used to determine the absolute time difference between the first and second zero-crossings. For example, the absolute time interval (TI) can be calculated using the following equation:

TI=Z–C#2 Time–Z–C#1 Time+(Latch#2–Latch#1)*RC Period, where Z-C# Time refers to the true zero-crossing times in each sampling circuit, Latch# refers to the cycle count in each sampling circuit latch and RC Period refers to the reference clock period. By using the cycle count, in addition to the reference clock phase information, the sampling strobe jitter from each sampling circuit can be effectively eliminated from the result. In addition, by repeating the measurement and varying the number of bit intervals between the trigger time of the first and second sampling circuits, a measurement data set can be collected that is suitable for a time interval jitter analysis.

Figure 16:
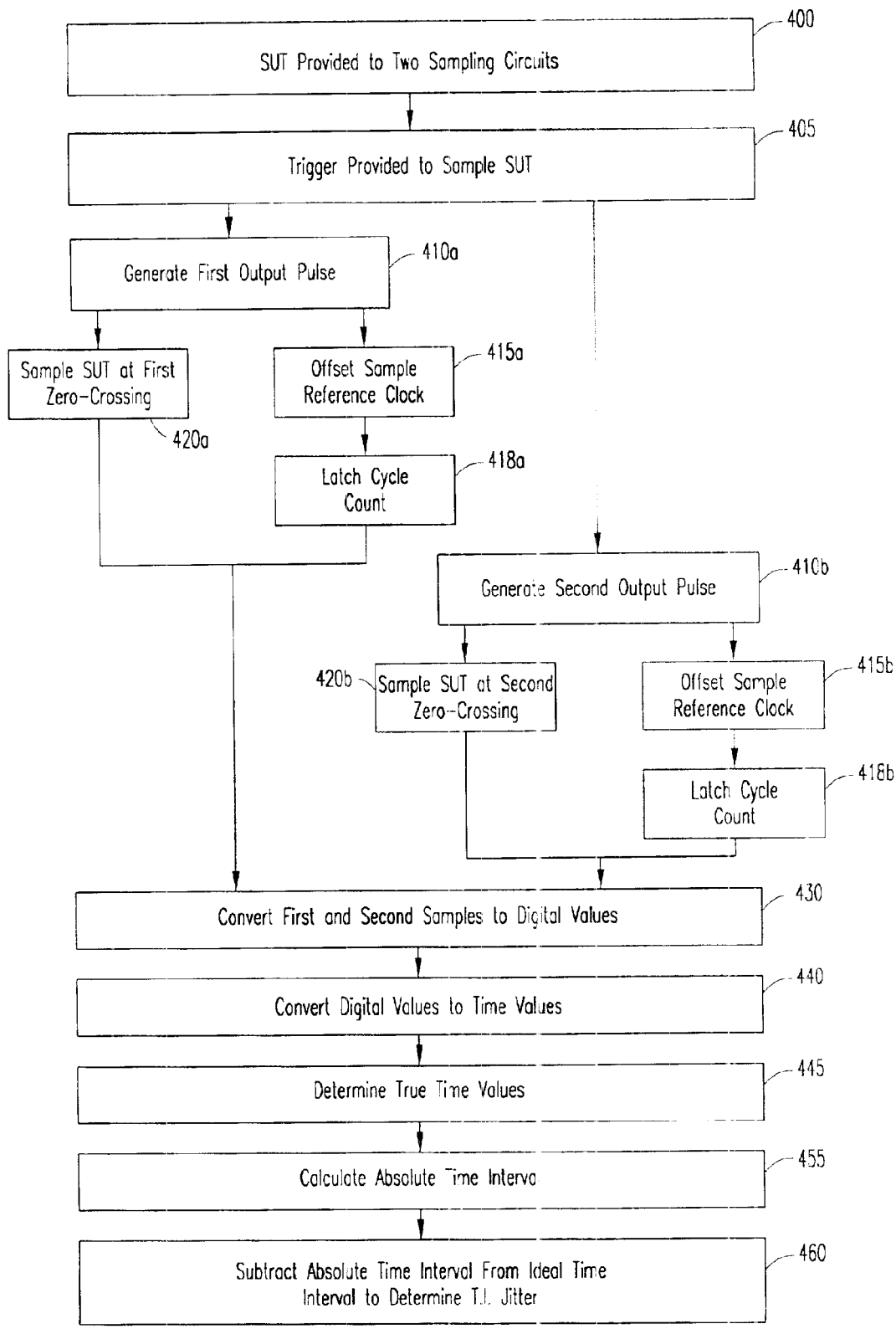
FIG. 16 is a flowchart illustrating the steps for determining the time interval jitter between two nearby or adjacent zero-crossings using the absolute time interval between the two zero-crossings.

FIG. 16 is a flowchart illustrating the steps for determining the time interval jitter between two nearby or adjacent zero-crossings using the absolute time interval between the two zero-crossings. The SUT is provided to two sampling circuits (step 400), and a trigger is provided to sample the SUT at two nearby or adjacent zero-crossing times by delaying the trigger towards one of the sampling circuits (step 405). The trigger causes an output pulse to be generated to one of the sampling circuits (step 410a) to sample a first zero-crossing of the SUT (step 420a), offset sample a first reference clock signal (step 415a) and latch the reference clock cycle count for the first offset reference clock (step 418a). The delayed trigger causes an output pulse to be generated to the other sampling circuit (step 410b) to sample a second zero-crossing of the SUT (step 420b), offset sample a second reference clock signal (step 415b) and latch the reference clock cycle count for the first offset reference clock (step 418b).

Thereafter, the amplitude values of the two measured zero-crossings are converted to digital amplitude values (step 430), and each digital amplitude value is converted to a time associated with the measured digital amplitude value on the transition associated with the respective zero-crossings being measured (step 440). The phase of the two reference clock samples are used to determine the true time values associated with each of the amplitude values (step 445) and the true time values and latched cycle counts are used to calculate the absolute time interval between the two zero-crossings (step 455). The measured absolute time interval and an ideal time interval for the two zero-crossings are subtracted from each other to produce a time interval jitter value (step 460).

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

We claim:

1. A jitter measurement system comprising:
   plural samplers for providing sample values, said plural sample having respective signal inputs and strobe inputs;

a pulse source for generating a pulse;

circuitry coupling a signal to said signal inputs and said pulse source to said strobe inputs so that said samplers provide sample values corresponding to distinct transition points in said signal; and a data processor for determining jitter associated with said signal in part as a function of said sample values.

2. The system of claim 1, wherein said circuitry comprises at least one delay element connected to at least one delayed one of said plural samplers, said delay element being set to an amount less than the transition time of said signal, said samples being used to determine the jitter associated with a single zero-crossing of said signal.

3. The system of claim 2, wherein said sample produce by said delayed sampler is used to determine the direction of zero-crossing of said signal, said sample produced by a first one of said samplers being used to measure the time of said zero-crossing of said signal, the measured time of said zero-crossing and the direction of said zero-crossing being used by said data processor to calculate the jitter associated with said zero-crossing.

4. The system to claim 3, wherein said data processor measures the time of said zero-crossing by extrapolating between said samples.

5. The system of claim 1, wherein said circuitry comprises a delay element connected to one of said plural samplers, said delay element being set to an integer multiple of the bit period of said data signal, said samples being used to determine the time interval jitter associated with first and second zero-crossings of said signal.

6. A sampling apparatus capable of being used with high data rate signal jitter measurement systems, comprises:

a first sampling circuit connected to sample a data signal and output a first sample associated with a first value of said data signal;

a second sampling circuit connected to sample said data signal and output a second sample associated with a second value of said data signal, said second value being offset in time from said first value;

at least one sampling strobe connected to generate at least one output pulse tod drive said first and second sampling circuits; and a delay element connected to said second sampling circuit and configured to provide the offset in time between said first value and second value, said first and second samples being used to measure the jitter associated with said data signal.

7. The apparatus of claim 6, further comprising:

a splitter connected to receive said data signal and provide said data signal to said first and second sampling circuits via respective first and second signal paths.

8. The apparatus of claim 7, wherein said delay element is provided on said second signal path associated with said second sampling circuit, said first and second sampling circuits being further connected to receive said output pulse from said sampling strobe substantially simultaneously and output said first and second samples, respectively, substantially simultaneously.

9. The apparatus of claim 6, wherein said delay element is provided on a path carrying said output pulse to said second sampling circuit, said delay element being configured to delay the sampling time of said data signal by said second sampling circuit as compared to the sampling time of said data signal by said second sampling circuit as compared to the sampling time of said data signal by said first sampling circuit.

10. The apparatus of claim 6, wherein said at least one sampling strobe comprises first and second sampling strobes associated with said first and second sampling circuits, respectively, and further compromising:

a single patter trigger circuit connected to trigger said first and second sampling strobes at a time aligned with a first zero-crossing of said data signal, said delay element being operatively connected between said pattern trigger circuit and said second sampling circuit to delay triggering of said second sampling circuit at a time aligned with a second zero-crossing of said data signal, said first and second samples being used to determine the time interval jitter between said first and second zero-crossings.

11. The apparatus of claim 6, wherein said delay element is set to an amount less than the transition time of said data signal, said second sample being used to determine the transition direction associated with a zero-crossing of said data signal in order to determine the jitter associated with said zero-crossing, said zero-crossing being determined from said first sample.

12. The apparatus of claim 11, further comprising:

a third sampling circuit connected to sample said data signal output a third sample associated with a third value of said data signal;

a first additional delay element connected to said second sampling circuit, said first additional delay element being set to an integer multiple of the bit period of said data signal, said first and third samples being used to determine the time interval jitter between first and second zero-crossings associated with said data signal, said first zero-crossing being determined from said first sample;

a fourth sampling circuit connected to sample said data signal and output a fourth sample associated with a fourth value of said data signal, said fourth value being offset in time from said third value; and a second additional delay element connected to said fourth sampling circuit, said second additional delay element being set to a fraction of the transition time of said data signal, said fourth sample being used to determine the transition direction associated with said second zero-crossing of said data signal in order to determine the jitter associated with said second zero-crossing, said second zero-crossing being determined from said third sample.

13. The apparatus of claim 6, wherein said delay element is set to an integer multiple of the bit period of said data signal, said first and second samples being used to determine the time interval jitter between two zero-crossings associated with said data signal, and two zero-crossings being determined from said respective first and second samples.

14. The apparatus of claim 13, further comprising:

a third sampling circuit connected to receive a reference clock signal and sample said reference clock signal to produce a first reference clock sample, said first reference clock sample being used to determine the phase of said reference clock signal at the time at least said first sample of said data signal is taken.

15. The apparatus of claim 14, further comprising:

a splitter connected to receive said reference clock signal and split said reference clock signal into first and second signal paths, said reference clock signal being filtered to be sinusoidal, said first signal path being connected to said third sampling circuit;

an additional delay connected on said second signal path, said additional delay being configured to delay said reference clock signal on said second signal path by around ninety degrees; and a fourth sampling circuit connected to receive said delayed reference clock signal and sample said delayed reference clock signal to produce a second reference clock sample, said first and second reference clock samples being used to determine the phase of said reference clock signal at the time at least said first sample of said data signal is taken, the phase being used to determine the true time that at least said first sample of said data signal is taken.

16. The apparatus of claim 15, wherein said splitter and additional delay element are provided within a ninety degree hybrid coupler.

17. The apparatus of claim 15, further comprising:

at least one counter connected to receive said reference clock signal and configured to count the number of cycles of said reference clock signal; and at least one latch connected to said counter and configured to latch the counted number of cycles at the time at least said first sample is taken.

18. The apparatus of claim 17, wherein said at least one counter comprises first and second counters associated with said first and second sampling circuits, respectively, and said at least one latch comprises first and second latches associated with said first and second sampling circuits, respectively, the number of cycles latched within said first and second latches being used to determine the absolute time interval between the true times associated with said first and second samples of said data signal, the absolute time interval being used to determine the time interval jitter associated with said zero-crossings of said data signal.

19. The apparatus of claim 6, further comprising:

first and second analog-to-digital converters connected to receive said first and second samples, respectively, and output first and second digital samples, respectively.

20. A sampling apparatus capable of being used with a high data rate jitter measurement system, comprising:

a first sampling circuit connected to receive a data signal, sample said data signal and output a first sample associated with a first value of said data signal;

a second sampling circuit connected to receive said data signal, sample said data signal and output a second sample associated with a second value of said data signal, said second value being offset in time from said first value;

at least one sampling strobe connected to provide at least one output pulse to drive said first and second sampling circuits;

a single pattern trigger circuit connected to trigger said at least one sampling strobe to generate said at least one output pulse; and a delay element connected to said second sampling circuit and being set to an integer multiple of the bit period of said data signal, said first and second samples being used to determine the time interval jitter associated with said first and second zero-crossings of said data signal.

21. The apparatus of claim 20, wherein said at least one sampling strobe comprises first and second sampling strobes connected to said pattern trigger circuit and being associated with said first and second sampling circuits, respectively, said first and second sampling strobes being connected to provide said respective output pulses to drive said first and second samplings circuits, said delay element being operatively connected between said pattern trigger circuit and said second sampling strobe to delay said output pulse produced by said second sampling strobe.

22. The apparatus of claim 21, further comprising:

a splitter associated with said first sampling circuit and connected to receive a reference clock signal and split said reference clock signal into first and second signal paths, said reference clock signal being filtered to be sinussoidal;

a first additional delay connected on said second signal path, said first additional delay being configured to delay said reference clock signal on said second signal path by around ninety degrees;

a third sampling circuit connected to receive said reference clock signal and sample said reference clock signal to produce a first reference clock sample; and a fourth sampling circuit connected to receive said delayed reference clock signal and sample said delayed reference clock signal to produce a second reference clock sample, said first and second reference clock samples being used to determine the phase of said reference clock signal at the time at least said first sample of said data signal is taken, the phase being used to determine the true time that at least said first sample of data signal is taken.

23. The apparatus of claim 22, further comprising:

an additional splitter associated with said second sampling circuit and connected to receive said reference clock signal and split said reference clock signal into third and fourth signal paths, said reference clock signal being filtered to be sinussoidal;

a second additional delay connected on said fourth signal path said second additional delay being configured to delay said reference clock signal on said fourth signal path by around ninety degrees;

a fifth sampling circuit connected to receive said reference clock signal on said first signal path and sample said reference clock signal to produce a third reference clock sample; and a sixth sampling circuit connected to receive said delayed reference clock signal on said fourth signal path and sample said delayed reference clock signal to produce a fourth reference clock sample, said third and fourth reference clock samples being used to determine the phase of said reference clock signal at the time said second sample on said data signal is taken, the phase calculated using said third and fourth reference clock samples being used to determine the true time that said second sample of data signal is taken.

24. The apparatus of claim 23, further comprising:

a first counter connected to said splitter associated with said first sampling circuit and configured to count the number of cycles of said reference clock signal received at said first sampling circuit at the time said first sampling circuit is triggered;

a first latch connected to said first counter and configured to latch a first counted number of cycles at the time at least said first sample is taken;

a second counter connected to said additional splitter associated with said second sampling circuit and configured to count the number of cycles of said reference clock signal received at said second sampling circuit at the time said second sampling circuit is triggered; and a second latch connected to said second counter and configured to latch a second counted number of cycles at the time at least said second sample is taken, said first and second counted number of cycles being used to determine the absolute time interval between the true times associated with said first and second samples of said data signal, the absolute time interval being used to determine the time interval jitter associated with said first and second zero-crossings of said data signal.

25. A method for determining the jitter associated with high data rate data signal, comprising:

generating at least one output pulse to drive first and second sampling circuits;

providing a delay element connected to said second sampling circuit;

sampling said data signal by said first sampling circuit to produce a first sample associated with a first value of said data signal; and sampling said data signal by said second sampling circuit to produce a second sample associated with a second value of said data signal, said second value being offset in time from said first value, said first and second samples being used to measure the jitter associated with said data signal.

26. The method of claim 25, further comprising:

splitting said data signal onto first and second signal paths, said first signal path connected to said first sampling circuit and said second signal path being connected to said second sampling circuit.

27. The method of claim 26, wherein said step of providing further comprises:

providing said delay element on said second signal path associated with said second sampling circuit, said first and second sampling circuits being further connected to receive said output pulse substantially simultaneously and produce said first and second samples, respectively, substantially simultaneously.

28. The method of claim 25, wherein said step of providing further comprises:

providing said delay element on a path carrying said output pulse to said second sampling circuit, said delay element being configured to delay the sampling time of said data signal by said second sampling circuit as compared to the sampling time of said data signal by said first sampling circuit.

29. The method of claim 25, wherein said step of generating further comprises:

generating first and second output pulses associated with said first and second sampling circuits, respectively, and further comprising the step of:

providing a single trigger to generate said first and second output pulses, said delay element delaying triggering of said second output pulse.

30. The method of claim 25, wherein said step of providing further comprises:

setting said delay element to an amount less than the transition time of said data signal, said second sample being used to determine the transition direction associated with a zero-crossing of said data signal in order to determine the jitter associated with said zero-crossing, said zero-crossing being determined from said first sample.

31. The method of claim 25, wherein said step of providing further comprises:

setting said delay element to an integer multiple of the bit period of said data signal, said first and second samples being used to determine the tine interval jitter between two zero-crossings associated with said data signal, and two-zero-crossings being determined from said respective first and second samples.

32. The method of claim 31, further comprising:

sampling a reference clock signal to produce a first reference clock sample, said first reference clock sample being used to determine the phase of said reference clock signal at the time at lest said first sample of said data signal is taken.

33. The method of claim 32, further comprising:

splitting said reference clock signal into first and second signal paths, said reference clock signal being filtered to be sinusoidal, said first reference clock signal being associated with said first signal path;

providing an additional delay connected on said second signal path, said additional delay being configured to delay said reference clock signal on said second signal path by around ninety degrees, sampling said delayed reference clock signal on said second signal path to produce a second reference clock sample; said first and second reference clock samplkes being used to determine the phase of said reference clock signal at the time at least said first sample of said data signal is taken, the phase being used to determine the true time that at least said first sample of data signal is taken.

34. The method of claim 33, further comprising:

counting the number of cycles of said reference clock signal; and latching the counted number of cycles at the time at least said first sample is taken.

35. The method of claim 34, wherein said step of counting comprises:

counting a first number of cycles of said reference clock signal associated with said first sampling circuit; and counting a second number of cycles of said reference clock signal associated with said second sampling circuit, and wherein said step of latching further comprises:

latching a first counted number of cycles at the time said first sample is taken; and latching a second counted number of cycles at the time said second sample is taken, said first and second counted number of cycles being used to determine the absolute time interval between the true times associated with said first and second samples of said data signal, the absolute time interval being used to determine the time interval jitter associated with two zero-crossings of said data signal.

* * * * *